United States Patent [19]

Right

[11] Patent Number: 4,571,586

[45] Date of Patent: Feb. 18, 1986

[54] ALARM CONSOLE CONTROLS

[75] Inventor: Robert W. Right, Huntington, Conn.

[73] Assignee: General Signal Corporation, Stamford, Conn.

[21] Appl. No.: 501,226

[22] Filed: Jun. 6, 1983

[51] Int. Cl.[4] .......................... H04Q 1/00; G08B 29/00

[52] U.S. Cl. .......................... 340/825.51; 340/825.37; 340/521; 340/517

[58] Field of Search ...................... 340/825.51, 825.37, 340/311.1, 825.76, 517–519, 521, 536; 455/58; 381/82, 81, 77, 78

[56] References Cited

U.S. PATENT DOCUMENTS

| | | | |
|---|---|---|---|
| 3,823,375 | 7/1974 | Wycoff | 455/58 |
| 3,964,047 | 6/1976 | Antonaccio | 340/825.76 |
| 3,978,479 | 8/1976 | Schmitz | 340/517 |
| 4,015,237 | 3/1977 | Takatani et al. | 340/519 |
| 4,052,720 | 10/1977 | McGregor et al. | 381/77 |
| 4,057,798 | 11/1977 | Ellson | 340/521 |
| 4,375,637 | 3/1983 | Desjardins | 340/517 |
| 4,400,694 | 8/1983 | Wong et al. | 340/825.51 |
| 4,468,655 | 8/1984 | Iwata | 340/518 |

*Primary Examiner*—Donald J. Yusko

*Attorney, Agent, or Firm*—Robert R. Hubbard; Jeffrey S. Mednick; Ronald Reichman

[57] ABSTRACT

An alarm console is provided which selectively generates audio signals in an ordered priority basis when there is a simultaneous request for two or more tone signals. The priority is from voice paging, highest priority; test mode, to test individually selected alarm tones; keyboard tone selection; automatic priority tone in response to a detected condition; automatic non-priority signal tone in response to a detected condition; and a lowest priority signal which typically comprises background music.

16 Claims, 1 Drawing Figure

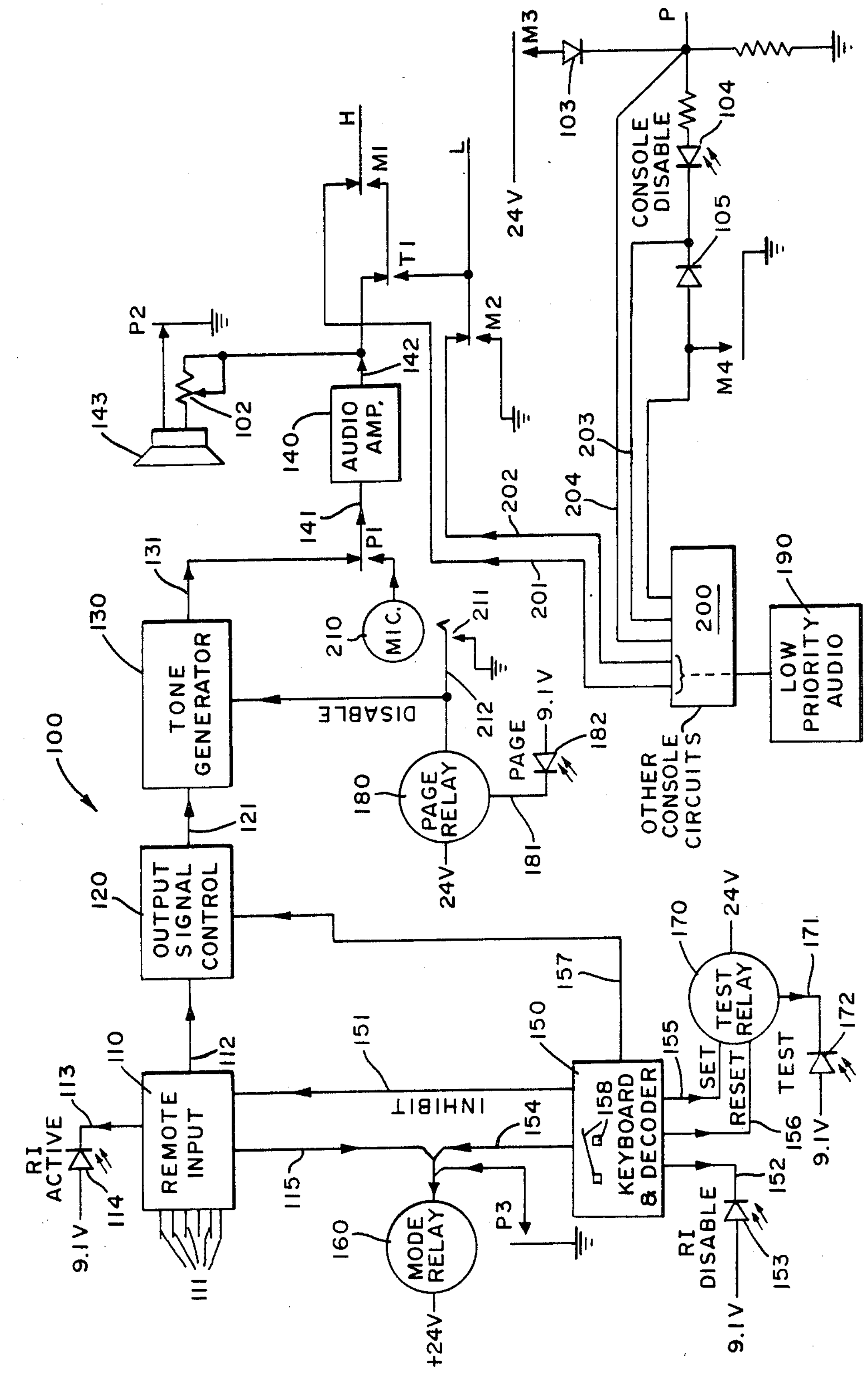
100
REMOTE INPUT
110
111
112
113
114
115
RI ACTIVE
9.1V
OUTPUT SIGNAL CONTROL
120
121
TONE GENERATOR
130
131
DISABLE
INHIBIT
151
KEYBOARD & DECODER
150
152
153
154
155
156
157
158
RI DISABLE
SET
RESET
MODE RELAY
160
+24V
P3
TEST RELAY
170
171
172
TEST
24V
PAGE RELAY
180
181
182
PAGE
MIC.
210
211
212
P1
141
AUDIO AMP.
140
142
143
102
P2
T1
M1
H
M2
L
201
202
203
204
200
OTHER CONSOLE CIRCUITS
LOW PRIORITY AUDIO
190
CONSOLE DISABLE
103
104
105
M3
M4
P

ALARM CONSOLE CONTROLS

BACKGROUND OF THE INVENTION

In a wide variety of situations and circumstances, it is convenient and common to provide a plurality of strategically-located audible signals which may be used for any of a wide variety of purposes frequently including one or more of the following: background music; paging; announcements; advertisements; and a variety of alarms or testing signals. Furthermore, there are situations and circumstances wherein it is desired to be able to apply the audible signals to less than the total plurality of audio devices. As the art has developed and various features have been made available, consumers have requested systems embodying a wider and wider variety and combination of features. Systems of the general nature to which reference has been made may find utility in a large department store to provide background music in at least selected areas during part of the time when the system is not otherwise engaged. At some other time, it may be appropriate to have an announcement made concerning an event or conditions and at other times, it may be desirable to be able to produce alarm tones in response to detected conditions and it is also desirable to be able to produce a wide variety of alarm tones in response to manual actuation at a keyboard. In addition, it is desirable to be able to include testing facilities to verify operation of the system and all features therein. Such systems may also find utility in hospitals, office buildings, high-rise residences and a variety of other applications with which those familiar with the use of systems of the character described are familiar.

In a system which is capable of providing a variety of tone signals and services, it is desirable to be able to assign a priority concerning the tone signal to be transmitted in the event that, in the absence of a control means, more than one signal would be broadcast concurrently. The central or control station is herein referred to as a console or control console and all automatic or manual requests for the transmission of audible signals to the remote stations are received at or originated from such console. The use of control consoles is well known in the art.

DESCRIPTION OF THE PRIOR ART

Consideration for the safety of personnel and property, together with advancing technology, has resulted in a rapid advance in the art of providing signals and alarms. In prior art systems, relatively few features were available in any one system and each system tended to be custom-designed for the specific application.

U.S. Pat. No. 3,656,158 issued Apr. 11, 1972 to Harry C. Goodwater, describes a low voltage audio fire alarm system fully integrated into a paging and music speaker system. This system is particularly directed to supervision of the system and components. However, it does disclose a system providing paging, background music and alarm signals through an audio system.

U.S. Pat. No. 4,012,727 issued Mar. 15, 1977 to Grossi, et al disclosed a flexible and expandable alarm control system in which varying combinations of functional circuit blocks or modules can be selected and connected by the customer. This allows some flexibility and adaptation to changing conditions.

U.S. Pat. No. 4,065,767 issued Dec. 27, 1977 to Neuhof, et al is of interest in that it discloses solid state circuit means for producing a wide variety of audio signals.

U.S. Pat. No. 4,109,246 issued Aug. 22, 1978 to Budrys, et al discloses a variety of features in an alarm system and, specifically, the ability to interrupt an alarm in progress to permit transmission of a higher priority alarm and then to resume transmission of the prior alarm.

U.S. Pat. No. 4,280,123 issued July 21, 1981 to Right discloses a compact and economical circuit for a multitone horn and a technique which might be used by the remote input circuit of the present configuration thereby allowing generation of a wide variety of audio signals in response to a signal on a selected one of a plurality of input leads.

SUMMARY OF THE INVENTION

The alarm console control of the invention may comprise one of a plurality of control consoles which are wired in a predetermined hierarchy configuration to control a plurality of remote stations all as more fully described in the co-pending application of the same inventor which is entitled CONSOLE PRIORITY CONTROL and which was filed on Mar. 24, 1983 and assigned Ser. No. 478,430. Various tones and/or alarms may be produced at the remote stations in the manner generally described in the last mentioned co-pending patent application. In the event that no alarm tones are generated in response to local signals applied to the remote input circuit, the alarm console control of this invention can provide a lowest priority audio signal to the remote stations. Typically, the lowest priority audio signal would comprise background music. Alarms to be sounded at a remote station in response to a local input signal applied thereto would disconnect the background music received from the control console.

In the event that a signal is received at the alarm console control indicating a non-standard condition that requires the activation of a remote station to initiate an alarm tone, the alarm console control will take priority over the background music and/or over any alarm tones broadcast by the remote station in response to local signals applied thereto in order to permit the appropriate alarm tone signal to be transmitted from the alarm console control. Typically, such priority signal would comprise any one of a plurality of possible signal tones each of which would indicate a different condition and be distinguished by their differing tones and/or nature of the audio signal. Audible tone signals defy description but have been given names including: Ding Dong; Yeow; Rapid Siren; Hi Lo; Chime; Fast Whoop; Stutter; Beep; Vibrato; Siren; Warble; Horn and Slow Whoop.

A specific non-standard condition which causes the application of a tone initiate request to the alarm console control can take priority over the plurality of signals just discussed to terminate their transmission and allow transmission of the higher priority alarm tone signal.

The alarm console control is further provided with a higher priority manual keyboard control so that, in response to manual activation of a selected key, any selected one of the available range of audio signals may be transmitted to the remote stations and take priority over any of the alarms heretofore named.

As an even higher priority operation, the keyboard may be used to place the alarm console control in a test mode to terminate any of the actions heretofore named and permit a variety of tests at the console.

Finally, an ultimate priority comprises activating a microphone to enable transmission of voice signals, as may be required, and concomitantly disable all signals heretofore mentioned.

Naturally it would be possible to use some signal other than voice paging for maximum priority, however, it is contemplated that under ultimate alarm conditions, voice signals would be most convenient and useful.

The wiring from the alarm console control to the remote stations comprises an audio pair and a priority control lead.

From the foregoing it will be seen that it is an object of the invention to provide a new and improved alarm console control with a range of features and controls not heretofore available.

It is another object of the invention to provide an alarm console control which provides for a plurality of alarm signals arranged in a pre-determined hierarchy with each level of alarm signal causing termination of any lower priority alarm signals.

It is another object of the invention to provide an alarm console control which can provide a wide variety of audio signals to remote stations in accordance with a predetermined hierarchy.

It is another object of the invention to provide an alarm console control of the nature described and including automatic and manual selection of signals in the various hierarchy orders.

Still another object of the present invention is to provide an improved alarm console control for maximum control over alarm signals and which substantially overcomes the disadvantages of the prior art structures and which is characterized by its reliability, ruggedness, ease and convenience of use, simplicity and low cost and high versatility and adaptability.

BRIEF DESCRIPTION OF THE DRAWING

To permit an incisive and detailed analysis of the operational characteristics of the invention, a single FIGURE comprising a block diagram illustrating the principle components is shown. The drawing discloses one form of the invention and is not meant in any way to delimit its scope, it is rather so drawn as an aid in understanding of the invention. Detailed circuits of the various components of the system are not shown as the inclusion of such detail would unnecessarily add to the complexity of the drawing, and the description thereof and would only serve to obscure the novel characteristics.

DESCRIPTION OF THE PREFERRED EMBODIMENT

The single sheet of drawing discloses the essential components of the alarm console control which will be referred to generally as 100. One component of the alarm console control is the remote input 110 which may include characteristics, features and techniques disclosed in the aforementioned U.S. Pat. No. 4,280,123. More specifically, the remote input unit 110 may include a plurality of input leads indicated generally as 111 and in response to a signal applied to any one of the input leads 111 a specific and predetermined corresponding output will be produced on one or more output leads represented collectively as 112. Thus, in response to an input on a specific one of the input leads 111, a corresponding specific output code will be placed on the output lead 112 and this will ultimately result in the generation of a corresponding unique audio output all in the manner more fully described in the aforementioned U.S. Pat. No. 4,280,123. It should be understood that at least one of the leads 111 may be a programmable lead in that it can be arranged to cause the reproduction of any specific one of the available audio output signals. Further, one of the input leads 111 may be wired in accordance with a priority hierarchy such that in response to an application of a signal to the priority input lead 111 the priority audio signal will be reproduced irrespective of whether an input signal is previously or subsequently applied to any of the other input leads 111 and persists for such time as the signal may be applied to the priority lead 111 or until some other portion of the console 100 requires the generation of a yet higher priority audio signal. In response to activation of the remote input unit 110, a signal is placed on lead 113 to provide a signal that the remote input unit 110 is active. The remote input active signal 114 could take any of a wide variety of forms. The remote input active signal is here indicated as RI Active and indicated as a light emitting diode 114 coupled to an appropriate potential supply. If circumstances warrant, the lead 113 could extend to a remote location.

In response to the unique electronic signal placed on the lead 112, which it should be understood may comprise a plurality of leads, the output signal control circuit 120 is activated. The output signal control circuit 120 will function in the manner generally described with respect to the microcomputer of the aforementioned 4,280,123 patent. The output of the output signal control circuit 120 is applied to the output lead 121, which it should be understood, may comprise a plurality of leads which are applied as an input to the tone generator 130. The tone generator 130 may comprise control circuits which in response to signals received from the output signals control 120 function to produce a unique one of a plurality of possible audio output signals all in the manner which may be generally similar as that described with respect to the output signal control circuit of the aforementioned U.S. Pat. No. 4,280,123. The output of the tone generator 130 is applied to the output lead 131, which may comprise more than a single wire. The output lead 131 passes through normally closed contacts P1 of the page relay, to be described more fully hereinafter, and is applied as an input on lead 141 to the audio amplifier 140. The output lead 142 of the audio amplifier is, among other things, coupled to the loud speaker monitor 143. Other ways in which the output signal of the audio amplifier 140 on the output lead 142 is used will be more fully described hereinafter.

Various input and output leads have been described such as: 111, 112, 121, 131, etc. It should be understood that in several cases the output lead from one unit comprises the input lead to another unit. As a matter of convenience, in order to indicate the direction of travel of the signal from one unit to another, a direction arrow has been placed on these and numerous other leads in order to indicate which unit provides signals to the other unit.

As thus far described, the console 100 may function in the general manner described in the aforementioned U.S. Pat. No. 4,280,123. In addition, and as will be explained more fully hereinafter, the system of this invention may comprise a plurality of consoles 100 which are coupled in a hierarchy or priority manner all as more fully described in the aforementioned co-pending U.S. Patent Application of the same inventor and filed on Mar. 24, 1983, and assigned Ser. No. 478,430

The console control also includes a keyboard and decoder 150 which comprises a plurality of individual keys 158 including an individual key for causing the origination of each of the plurality of alarm tones. In addition, a key may be provided for terminating an alarm tone originated in response to a signal on one of the input leads 111 of the remote input 110. Another key may be used to switch the console control to the test mode and/or to reset the console or restore it to normal standby condition. A key 158 on the keyboard module 150 may also be used to disable lower priority console controls. A keyboard module key 158 may also be provided for disconnecting the local loud speaker 143.

In response to the actuation of a key 158 in the keyboard module 150 which is designed and designated to disable the remote input module 110, a signal is placed on the lead 151 to inhibit the remote input 110. Concurrently, a signal is also placed on lead 152 to activate a remote input disable signal 153. The remote input disable signal 153 is illustrated as a light emitting diode. However, it should be understood that any appropriate form of signal could be incorporated and, if desired, this and/or other similar signals, to be described, could be extended to remote locations. If one of the plurality of keys in the keyboard module 150 is depressed for manual initiation of an alarm tone the remote input 110 will be disabled via the inhibit lead 151, as described, and the remote input disable signal 153 will be activated by a signal on the lead 152, as described. In addition, a signal will be placed on lead 154 to activate the mode relay 160. As may be seen, the remote input module 110 may also place a signal on lead 115 to actuate the mode relay 160. The function of the mode relay 160 will be discussed more fully hereinafter. Signals from the keyboard and decoder 150 on leads 155 and 156 may be used to set and reset the test relay 170 and when the test relay 170 is activated, a signal from it on lead 171 will activate the test supervisory lamp 172 to indicate that the system is in test mode. The test lamp 172 is similar to the remote input disable lamp 153 and may comprise any type of convenient local or remote signal as best served by the requirements of the application. When one of the keys of the keyboard module 150 is depressed to cause the initiation of an alarm tone, a signal is placed on one or more of the plurality of leads represented by the line 157 to the output signal control 120 which in turn, will cause appropriate signals to be placed on output lead 121 of the output signal control 120 to provide an input to the tone generator 130 all as previously described in connection with the activation of the remote input 110.

Since the keyboard unit 150 can disable the remote input 110, it is evident that the keyboard unit 150 has a higher priority than the remote input 110 and, thus, use of the keyboard 150 takes priority over the remote input 110. If required the function of the inhibit lead 151 could be reversed to cause the remote input unit 110 to take priority over the keyboard 150.

The various leads interconnecting the various modules may comprise more than one wire and, for convenience, arrows are included on each lead to indicate the direction in which signals travel from one module to another. As thus far described, it will be seen that both the remote input module 110 and the keyboard and decoder module 150 may function to operate the mode relay 160. In addition, the keyboard module 150 may actuate the test relay 170. The mode relay 160 and test relay 170 are illustrated as electro-mechanical devices. However, it should be understood that equivalent solid state circuits or other techniques may be used. In this illustration, the relay contacts associated with the mode relay are all designated M with a suffix number and, in like manner, any contact associated with the test relay 170 are designated T with a suffix number. In like manner, there is a page relay 180 to be discussed more fully hereinafter and contacts associated therewith are designated P with a suffix number.

Output leads from the console control 100 include leads H, L and P which may extend to remote signal devices all in the manner more fully described in the cited co-pending application Ser. No. 478,430. Further, the aforementioned co-pending application discloses the manner in which a plurality of consoles 100 may be arranged in a priority system. This is illustrated, by way of summary, herein. For example, the low priority audio signal 190 is connected to the lowest priority of a group of one or more other console circuits 200 in series in such manner that the audio signal is applied to the leads 201 and 202. The signal on lead 201 passes through normally closed contacts M1 of the mode relay 160 and out to the H lead. In like manner, the signal on lead 202 passes through the normally closed contacts M2 of the mode relay 160 and extends to the remote signal devices on the L lead. Any of the lower priority console circuits 200 may disconnect the low priority audio 190 and cause other audio signals to be applied to the leads 201 and 202 in much the same manner that the console control 100 may cause an audio output on lead 142.

If the console control 100 is activated by activation of either the remote input 110 or the keyboard module 150, the mode relay 160 will be actuated. In response to the activation of the mode relay, under either of the two circumstances mentioned, the contacts M1 and M2 will both be activated thereby disconnecting any audio signals on the leads 201 and 202 from the output H and L leads. The actuation of the M2 contacts will place a ground potential on the L lead and the audio signal on lead 142 from the audio amplifier 140 will pass through the normally closed contacts T1 of the test relay 170 and the now-closed contacts of the M1 relay to the H lead. From this it will be seen that actuation of the mode relay 160 effectively disconnects the low priority audio 190 from the leads 201 and 202 and/or disconnects any alternate audio signals provided from other console circuits 200 which may be applied to the leads 201 and 202. Or, phrased differently, the console control 100 has higher priority than any of the other console circuits 200 and can cause application of a tone signal to the output H and L leads in response to an input on any of the plurality of leads 111, one of which may be a priority lead, or in response to activation of a tone initiation key 158 of the keyboard 150.

Situations may arise wherein it is desirable to test the local console 100 using the facilities of the keyboard 150. In this case, actuation of the appropriate key at the keyboard module 150 will cause actuation of the test relay 170 thereby activating the contacts T1 so that the audio signal from the audio amplifier 140 cannot be extended to the H lead. However, the audio signal on lead 142 is extended to the loud speaker 143 thereby allowing local reproduction of the test tone. This permits testing of the various components of the console 100. The resistor 102 associated with the loud speaker 143 provides for adjustment of the audio level of the loud speaker 143.

When the mode relay 160 is activated, the M1 and M2 contacts will switch position as already described. In addition, the M3 and M4 contacts will close. In response to activation of the M3 contacts a signal will pass through diode 103 to the P lead to the remote signalling devices for the purpose more fully described in the aforementioned co-pending application Ser. No. 478,430. In addition, the M4 contact will apply a ground through diode 105 to lead 203 which will illuminate the console disable lamp in the lower priority console circuits 200. The circuit for doing this is more fully described in the aforementioned co-pending application Ser. No. 478,430. The console 100 described herein also includes a console disable lamp 104 although the highest priority console 100 cannot be disabled by any of the other console circuits 200. The circuit 100 includes the console disable lamp 104 in order that all consoles may be interchangeable and identical. It may be observed that the power for activating the console disable lamps of the other console circuits 200 is derived from the console 100. That is, the ground signal passes through contact M4 and diode 105 to lead 203 and a signal is concurrently passed from a power supply through contacts M3 and diode 103 to the lead 204 and the console disable light emitting diodes of the other console circuits 200 are bridged across these leads. All as more fully described in the aforementioned co-pending application Ser. No. 478,430.

The system of the present invention may be used as a system for providing a warning indicative of dangerous and/or abnormal conditions. The circumstances or exigencies of the situation may render it expedient to provide voice communication by means of which specific instructions and warnings may be given. The system is designed to facilitate voice communication and to provide that it shall have priority over all other means and techniques for generating and distributing alarm tones. Accordingly, there is provided a microphone 210 and an associated switch 211 which may be activated in response to any convenient means. For example, the switch 211 may be manually actuated or it could be voice actuated in response to speech input into the microphone 210. Or, the switch 211 may be automatically actuated in response to grasping or picking up the microphone 210. In any event, in response to the activation of the switch 211 a ground signal is placed on lead 212 to activate the page relay 180 and concurrently to disable the tone generator 130. In response to activation of the page relay 180 a signal is placed on the lead 181 to activate the light emitting diode 182 in a manner similar to that by which other light emitting diodes may have been activated. In response to the activation of the page relay 180 the P1 relay contacts associated therewith will be activated to disconnect the tone generator 130 from the audio amplifier 140 and to connect the microphone 210 directly through the now-closed contacts P1 to the audio amplifier. The contacts P2 of the page relay 180 will disconnect the loud speaker 143 and the contacts P3 will activate the mode relay 160. Accordingly, in response to utilization of the microphone 210, both the page relay 180 and the mode relay 160 will be operated. The voice signals passed through contacts P 1 to the audio amplifier on lead 141 will be placed on output lead 142 and passed to the H lead to the remote annunciators through the closed contacts M1. The L lead is, of course, connected to ground through closed contacts M2.

In summary, there has been disclosed an alarm console control which can transmit a lowest priority audio signal, usually background music, when no condition exists which requires a transmission of any other signal. As the system is arranged, the next higher priority audio tone may be reproduced in response to an input on any of most of the leads 111 to the remote input circuit 110. A still higher priority alarm tone may be transmitted from the console 100 in response to an input signal on a specific one of the leads 111 constituting a priority input lead. Manual tone generation from the keyboard 150 constitutes the next higher priority generation of an alarm tone. The next higher priority operation of the console 100 comprises a test mode operated from the keyboard 150 wherein an audio tone is not transmitted to the remote signalling stations and is broadcast only locally for testing purposes. The highest priority audio signal comprises the voice paging signal from the microphone 210. It should be understood that in response to any signal indicating the need to transmit an alarm tone there will be an automatic termination of the transmission of any lower priority audio signal. Furthermore, activation of console 100, for any purpose whatsoever, will disable any lower priority console all as more fully described hereinabove and the co-pending application Ser. No. 478,430.

It should be understood that the input signals placed on leads 111 do not constitute audio signals. The signals placed thereon may be converted by the combination of the remote input unit 110, the output signal control 120 and the tone generator 130 to an audio signal. In like manner, audio signals are not directly reproduced by the keyboard and decoder 150. Typically, the keyboard and decoder will comprise a matrix and in response to depression of any one of the keys 158, a cross point connection is initiated all in a manner very familiar to those acquainted with such devices. It should be understood that the system may include other decoders, matrices and/or translators not specifically shown herein in order to convert the signal as output from one device to the signal required as an input to the next device. It should also be understood that many of the connections shown as a single line may comprise a plurality of connections and that a variety of amplifiers, inverters and power supplies may be used. Circuit designers who are acquainted with the types of components and modules discussed herein will experience little, if any, difficulty in assembling a console of the character described using any of a wide variety of techniques and components familiar to those skilled in the associated arts.

While there has been shown and described what is considered at present to be a preferred embodiment of the invention, modifications thereto will readily occur to those skilled in the related arts. For example, in another structure the priority hierarchy could be altered and the relays could be replaced by solid state devices. It is believed that no further analysis or description is required and that the foregoing so fully reveals the gist of the present invention that those skilled in the applicable arts can adapt it to meet the exigencies of their specific requirements. It is no desired, therefore, that the invention be limited to the embodiments shown and described, and it is intended to cover in the appended claims all such modifications as fall within the true spirit and scope of the invention.

What is claimed is:

1. A priority alarm, paging and signalling system arranged in a predetermined hierarchy with each level of alarm paging and signalling causing termination of any lower priority alarm paging and signalling signal, said system comprising in cooperative combination:

(a) a console control station including a three wire output that may be used to control a plurality of remote sound generating and reproducing stations, and an alarm tone generator for selectively generating any one of a plurality of tone signals:

(b) a remote input unit having a plurality of input control leads and with said coupled to the output of a remote control unit the output of said remote input unit is coupled to the input of said tone generator for activating said tone generator to generate a selective one of said plurality of tone signals in response to a signal on a corresponding selected one of said plurality of input control leads;

(c) a keyboard control unit coupled to said tone generator unit for activating said tone generator to generate a unique one of said plurality of tone signals in response to activation of a corresponding unique key of said keyboard control unit;

(d) disable means coupled between said keyboard control unit and said remote control unit to give one of said keyboard or remote control units priority over the other when both are simultaneously activated;

(e) voice paging means;

(f) an audio amplifier; and (g) first coupling means for selectively coupling said voice paging means or said alarm tone generator to said audio amplifier.

2. The combination as set forth in claim 1 and including audio reproducing means associated with said control station for audibly reproducing the tone signal amplified by audio amplifier.

3. The combination as set forth in claim 2 and including second coupling means which is activated to a first state, when said voice paging means is activated, for disconnecting said audio reproducing means.

4. The combination as set forth in claim 1 wherein said control station includes a priority output lead to which a unique signal is coupled in response to activation of said voice paging means.

5. The combination as set forth in claim 1 wherein said control station includes a priority output lead to which a unique signal is coupled in response to activation of said remote input unit.

6. The combination as set forth in claim 1 wherein said control station includes a priority output lead to which a unique signal is coupled in response to activation of said remote input unit of said keyboard control unit.

7. The combination as set forth in claim 1 wherein said control station includes a priority output lead to which a unique signal is coupled in response to activation of said remote input unit of any one of said remote input unit, said keyboard control unit or said voice paging means.

8. The combination as set forth in claim 1 and including a source of low priority audio signals for application to the output of said control station when no other signal is required in response to activation of any one of said remote input unit, said keyboard or said voice paging means.

9. The combination as set forth in claim 8 wherein in response to the use of said voice paging means said low priority audio signals, said keyboard, and said remote input unit are all disabled so they cannot control an audio output from said control station.

10. The combination as set forth in claim 1 and including a plurality of control stations with one having a higher priority than the others and including means for said higher priority station to disable the lower priority control stations.

11. The combination as set forth in claim 1 wherein one of said selected ones of said plurality of input control leads to said remote input unit has priority for causing said tone generator to generate an associated signal irrespective of the concomitant presence of a signal on any of the other of said plurality of input control leads.

12. The combination as set forth in claim 1 and including an output signal control circuit coupled to said remote input unit and said keyboard control unit for decoding input signals thereto.

13. The combination as set forth in claim 12 wherein the output of said output signal control circuit is coupled to said tone generator.

14. The combination as set forth in claim 1 wherein said keyboard control circuit may be selectively activated in either or an alarm sending mode or a system testing mode.

15. The combination as set forth in claim 14 and including mode means which is activated to a first state when said keyboard control circuit is activated in said alarm sending mode.

16. The combination as set forth in claim 14 and including test means which is activated to a first state when said keyboard control circuit is activated in said testing mode.

* * * * *